United States Patent
Chiang

(10) Patent No.: US 9,614,412 B2
(45) Date of Patent: Apr. 4, 2017

(54) SHAFT ASSEMBLING STRUCTURE

(71) Applicant: JIA HUEI MICROSYSTEM REFRIGERATION CO., LTD, Taoyuan (TW)

(72) Inventor: Wen-Fu Chiang, Taoyuan County (TW)

(73) Assignee: JIA HUEI MICROSYSTEM REFRIGERATION CO., LTD., Taoyuan (TW)

( * ) Notice: Subject to any disclaimer, the term of this patent is extended or adjusted under 35 U.S.C. 154(b) by 180 days.

(21) Appl. No.: 14/505,641

(22) Filed: Oct. 3, 2014

(65) Prior Publication Data
US 2015/0107098 A1    Apr. 23, 2015

(30) Foreign Application Priority Data
Oct. 17, 2013   (TW) .............................. 102219335 U

(51) Int. Cl.
H02K 7/04      (2006.01)
H02K 1/30      (2006.01)

(52) U.S. Cl.
CPC ................. H02K 7/04 (2013.01); H02K 1/30 (2013.01); *Y10T 29/53143* (2015.01)

(58) Field of Classification Search
CPC ....... H02K 1/30; H02K 7/04; Y10T 29/53143
See application file for complete search history.

(56) References Cited

U.S. PATENT DOCUMENTS

| | | | | |
|---|---|---|---|---|
| 2,174,536 A | * | 10/1939 | Smith | F25B 31/002 417/433 |
| 2,991,930 A | * | 7/1961 | Lindner | F04C 28/14 418/159 |
| 5,563,463 A | * | 10/1996 | Stark | H01F 41/0253 29/598 |
| 6,291,920 B1 | * | 9/2001 | Miller | F16F 15/28 310/261.1 |
| 7,563,084 B2 | * | 7/2009 | Kurita | F04C 18/322 418/29 |
| 2005/0191198 A1 | * | 9/2005 | Sato | F04C 18/3564 418/60 |
| 2015/0107098 A1 | * | 4/2015 | Chiang | H02K 7/04 29/732 |
| 2016/0006305 A1 | * | 1/2016 | Chiu | H02K 1/30 310/156.29 |

* cited by examiner

*Primary Examiner* — Minh Trinh
(74) *Attorney, Agent, or Firm* — Jackson IPG PLLC; Demian K. Jackson

(57) ABSTRACT

A shaft assembling structure includes a shaft hole formed on a motor rotor and a shaft with a shaft end sheathed on a shaft hole of the motor rotor. The shaft assembling structure further includes a direction setting member secured to the top of the motor rotor and embedded with the shaft, and at least one direction setting member disposed at the bottom of the shaft assembling structure and extended into the first direction setting portion of shaft hole. The shaft end of the shaft includes at least one second direction setting portion embedded into the corresponding first direction setting portion. When the second direction setting portion is aligned precisely with the first direction setting portion, the shaft hole of the motor rotor is sheathed on the shaft end of the shaft to facilitate the process of recognizing and confirming the rotating direction of the shaft.

14 Claims, 6 Drawing Sheets

SHAFT ASSEMBLING STRUCTURE

FIELD OF THE INVENTION

The present invention relates to an assembling structure of a shaft and a motor rotor, in particular to the shaft assembling structure capable of setting the center and direction between the shaft and the motor rotor.

BACKGROUND OF THE INVENTION

In general, an electric compressor provided for compressing a coolant and circulating the compressed coolant in a circuit is driven by a DC motor coupled to the compressor, so as to achieve the effects of compressing and circulating the coolant. Different internal compression mechanisms include various models of rotary compressors, scroll compressors and screw compressors.

Wherein, the scroll compressor has the issue of a relatively difficult manufacturing process and incurs a high cost. Although both rotary compressors and screw compressors complete a compression process by changing the volume of a compression chamber, the rotary compressors adopt a simple compression method and skillfully avoid the problems including the deviation of the screw compressors caused a force exertion in an axial direction, the clearance volume, and the internal leakage, so as to improve the reliability and performance of the equipments and accomplish a relatively higher market share.

In a rotary compressor as shown in FIG. 1, an eccentric shaft 11 is installed to the center of the motor rotor 12, such that when the eccentric shaft 11 rotates with the motor rotor 12 to turn around in a housing 13, the eccentric shaft 11 and a cylinder wall form a series of compression chambers of different volumes to achieve the effect of compressing the coolant progressively. In the operation of the rotary compressors, the cylinder is compressed by an eccentric method, so that there are issues of having vibrations and increasing the torque.

Although some motor rotors 12 of the conventional rotary compressors comes with a weight 14 to inhibit the vibration caused by the eccentric rotation, yet when the eccentric shaft 11 is installed to the motor rotor 12, the level of difficulty of setting the center and direction of the eccentric shaft 11 is increased. Therefore, it is a main subject for related manufacturers to design and develop a mechanism for setting the center and the direction between the eccentric shaft and the motor rotor quickly to improve the assembling quality and production capacity of the rotary compressors.

SUMMARY OF THE INVENTION

Therefore, it is a primary objective of the present invention to overcome the aforementioned problem of the prior art by providing a shaft assembling structure capable of setting the center and direction between the shaft and the motor rotor quickly.

To achieve the aforementioned objective, the present invention provides a shaft assembling structure comprising a motor rotor with a shaft hole formed thereon, and a shaft with a shaft end sheathed on a shaft hole of the motor rotor, characterized in that the shaft assembling structure comprises a direction setting member secured to the top of the motor rotor and embedded to the shaft, and the direction setting member includes at least one first direction setting portion disposed at the bottom of the direction setting member and extended into the shaft hole, and the shaft end of the shaft has at least one second direction setting portion embedded with the corresponding first direction setting portion.

With the aforementioned technical characteristics of the shaft assembling structure of the present invention, the second direction setting portion of the shaft must be aligned precisely with the first direction setting portion of the direction setting member before the shaft hole of motor rotor is sheathed on the shaft end of the shaft to confirm the rotating direction of the shaft quickly during an assembling process, so as to obtain a stable rotation of the shaft, and when the second direction setting portion and the first direction setting portion are embedded with each other, the relative rotation of the shaft and the motor rotor is limited so that the motor rotor and the shaft can be assembled and connected more securely and reliably.

Specifically, the shaft assembling structure of the present invention is provided for installing the shaft in the correct rotating direction for sure during the process of connecting the direction setting member and the shaft, so that the motor rotor and the shaft may have a stable and smooth operation. Further, the shaft assembling structure includes a plurality of first direction setting portions and second direction setting portions, and each first direction setting portion and each second direction setting portion may come with a design of significantly different widths, so that assemblers can recognize and confirm the rotating direction of the shaft quickly. The invention is particularly applicable for assembling the eccentric shaft and motor rotor of the rotary compressor to improve the assembling quality and production capacity of the rotary compressor.

The present invention will become clearer in light of the following detailed description of an illustrative embodiment of this invention described in connection with the drawings. It is intended that the embodiments and drawings disclosed herein are to be considered illustrative rather than restrictive.

DESCRIPTION OF THE PREFERRED EMBODIMENTS

Figure 1:
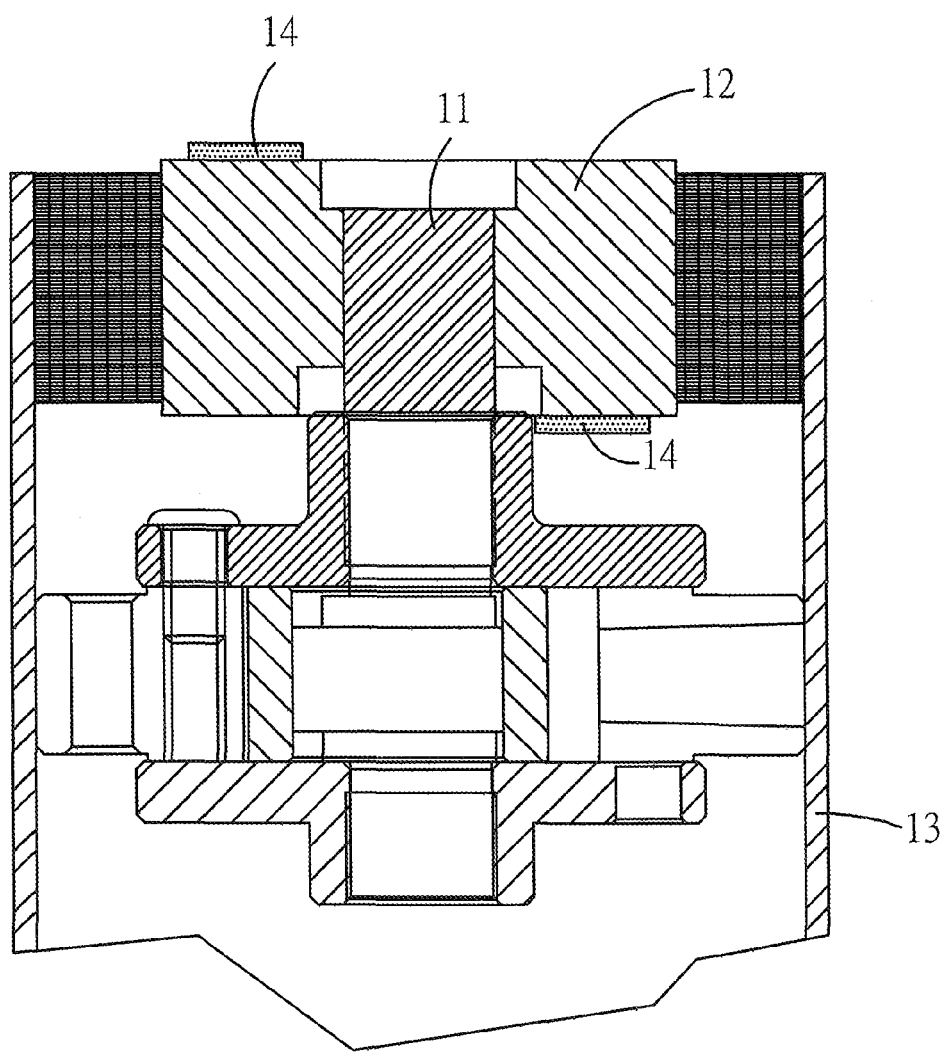
FIG. 1 is a cross-sectional view of a conventional rotary compressor.
Figure 2:
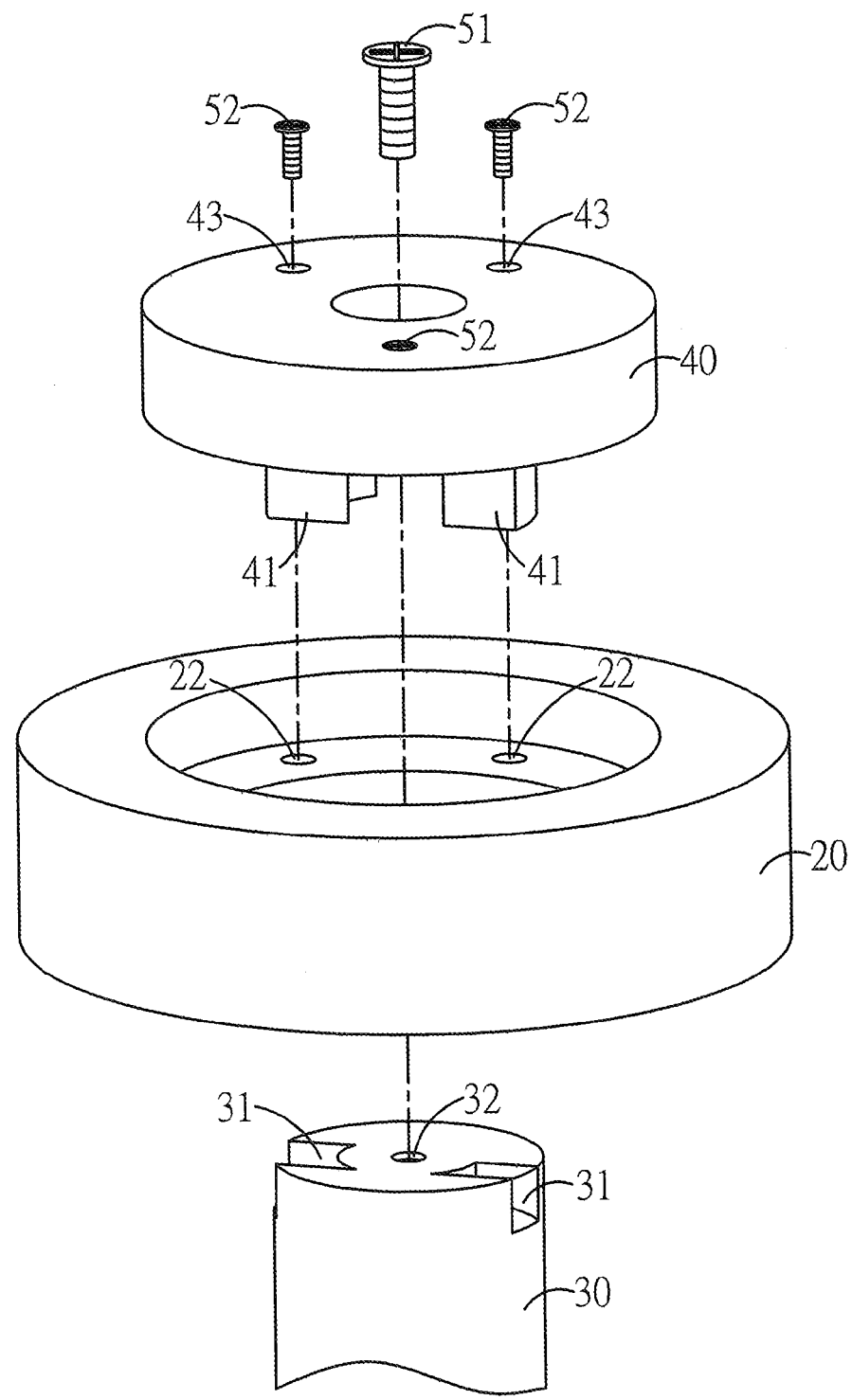
FIG. 2 is a perspective view of a shaft assembling structure of a first preferred embodiment of the present invention.
Figure 3:
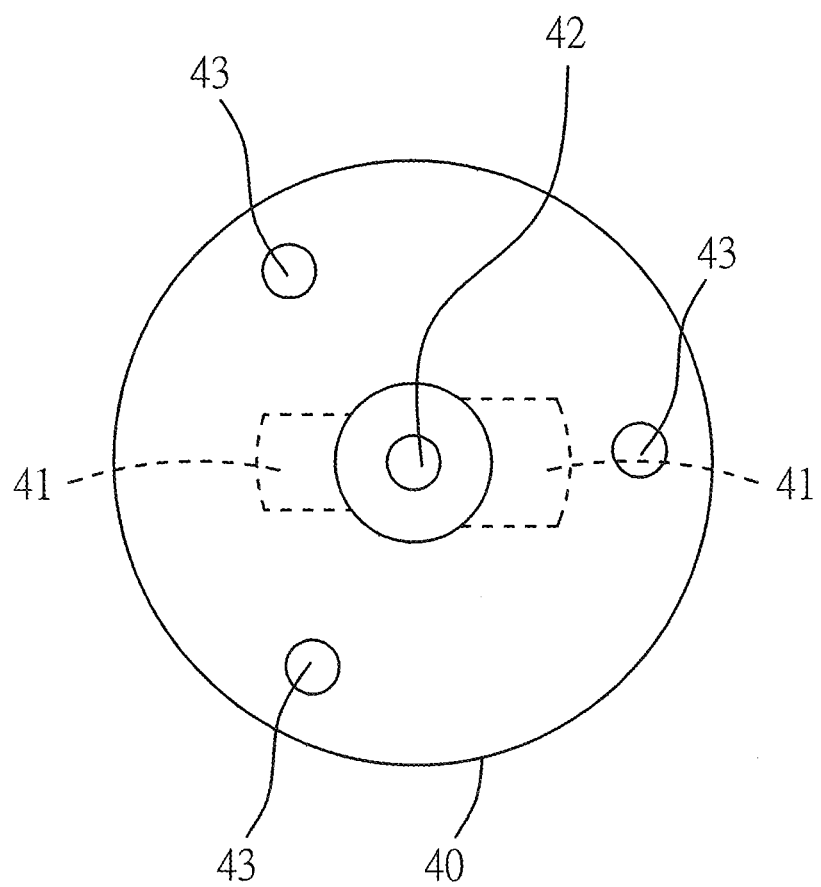
FIG. 3 is a top view of a shaft assembling structure of the first preferred embodiment of the present invention.
Figure 4:
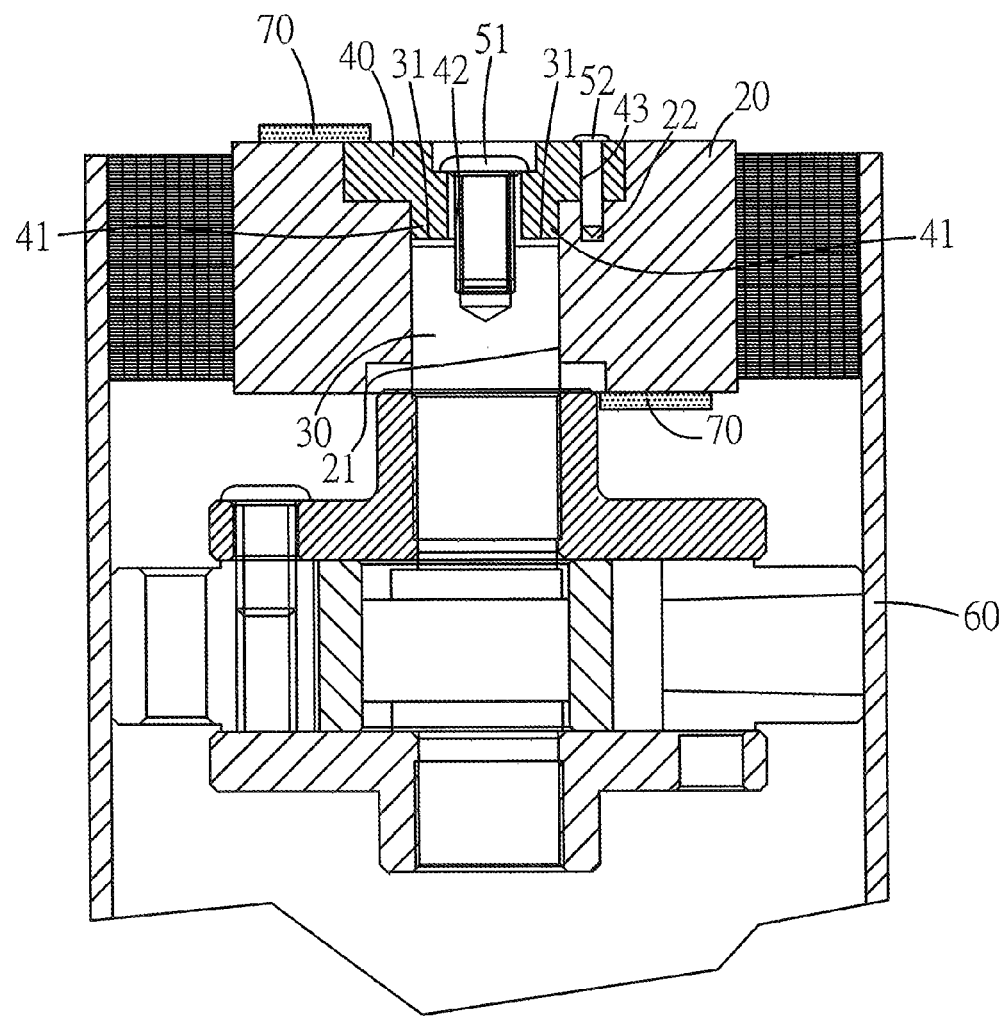
FIG. 4 is a schematic view of installing a shaft assembling structure of the first preferred embodiment of the present invention.

With reference to FIGS. 2 to 4 for an exploded view, a top view and a schematic view of a shaft assembling structure of the first preferred embodiment of the present invention capable of quickly setting the center and direction between the shaft and the motor rotor respectively, the shaft assembling structure comprises a shaft hole 21 formed on a motor rotor 20 and a shaft end of a shaft 30 sheathed on the shaft hole 21 of the motor rotor 20.

The shaft assembling structure includes a direction setting member 40 secured to the top of the motor rotor 20 and embedded with the shaft 30, and at least one first direction setting portion 41 disposed at the bottom of the direction setting member 40 and extended into the shaft hole 21. The shaft end of the shaft 30 includes at least one second direction setting portion 31 embedded with the corresponding first direction setting portion 41.

In this preferred embodiment, the direction setting member 40 includes a plurality of first direction setting portions 41 with different widths, and the shaft 30 includes a plurality of second direction setting portions 31 disposed at the shaft end and corresponsive to the first direction setting portions 41 respectively, and each second direction setting portion 31 has a width capable of embedding with the corresponding first direction setting portion 41 precisely. The first direction setting portion 41 as shown in the figure is a bump with a predetermined height protruding from the bottom of the direction setting member 40, and each second direction setting portion 31 is a slot with a predetermined depth penetrating into an end surface of the shaft 30. Of course, each first direction setting portion may be a slot with a predetermined depth penetrating into the bottom of the direction setting member, and each second direction setting portion is a bump with a predetermined height protruding into an end surface of the shaft to achieve the same embedding effect.

During an application of the shaft assembling structure of the present invention, the second direction setting portion 31 of the shaft 30 must be aligned precisely with the first direction setting portion 41 of the direction setting member 40 before the shaft hole 21 of the motor rotor 20 is sheathed on the shaft end of the shaft 30, so that the rotating direction of the shaft can be confirmed quickly during the assembling process, and the shaft can be rotated stably. In addition, when the second direction setting portion 31 and the first direction setting portion 41 are embedded, the relative rotation of the shaft 30 and the motor rotor 20 is limited to achieve the effect of obtaining a stable and reliable assembling effect of the motor rotor 20 and the shaft 30.

In the shaft assembling structure of the present invention, the direction setting member 40 includes a first screw through hole 42 corresponsive to the center of the shaft end of the shaft 30, and the shaft 30 has a first screw hole 32 formed at the center of the shaft end and a first screw 51 passed into the first screw through hole 42 of the direction setting member 40 and screwed into the first screw hole 32 of the shaft 30 to improve the effect of connecting the shaft 30 and the direction setting member 40. Similarly, the motor rotor 20 includes a plurality of second screw holes 22 formed at corresponding positions other than the shaft hole 21, and the direction setting member 40 includes a plurality of second screw through holes 43 corresponsive to the second screw holes 22 respectively and a plurality of second screws 52 passed into the second screw through holes 43 of the direction setting member 40 and screwed into the second screw holes 22 of the motor rotor 20 respectively to achieve the effect of securing the direction setting member 40 to the top of the motor rotor 20 for sure.

Compared with the conventional structure, the shaft assembling structure of the present invention confirms the installation of the shaft to the correct rotating direction during the process of connecting the direction setting member and the shaft, so that the motor rotor and the shaft obtain a stable and smooth operation. Further, the invention comprises a plurality of first direction setting portions and second direction setting portions, and each first direction setting portion and each second direction setting portion come with the design of having significantly different widths, so that assemblers can recognize and confirm the rotating direction of the shaft quickly.

Figure 5:
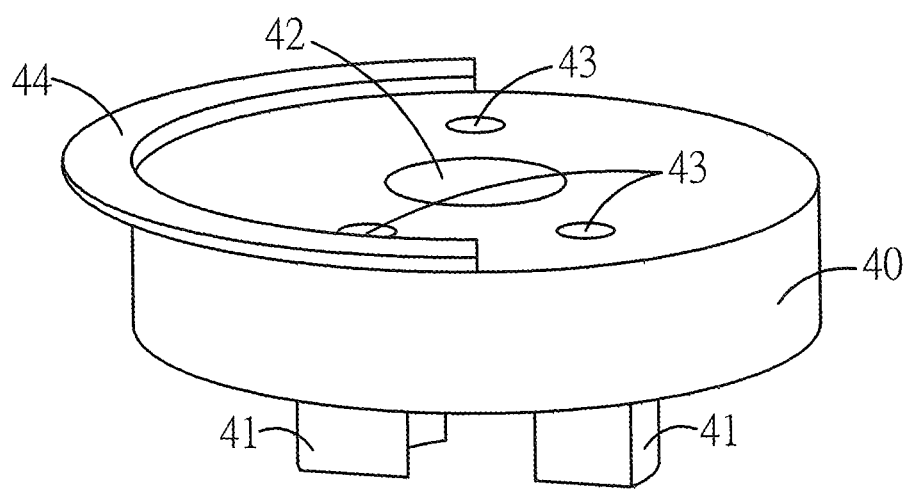
FIG. 5 is a perspective view of a shaft assembling structure of a second preferred embodiment of the present invention.
Figure 6:
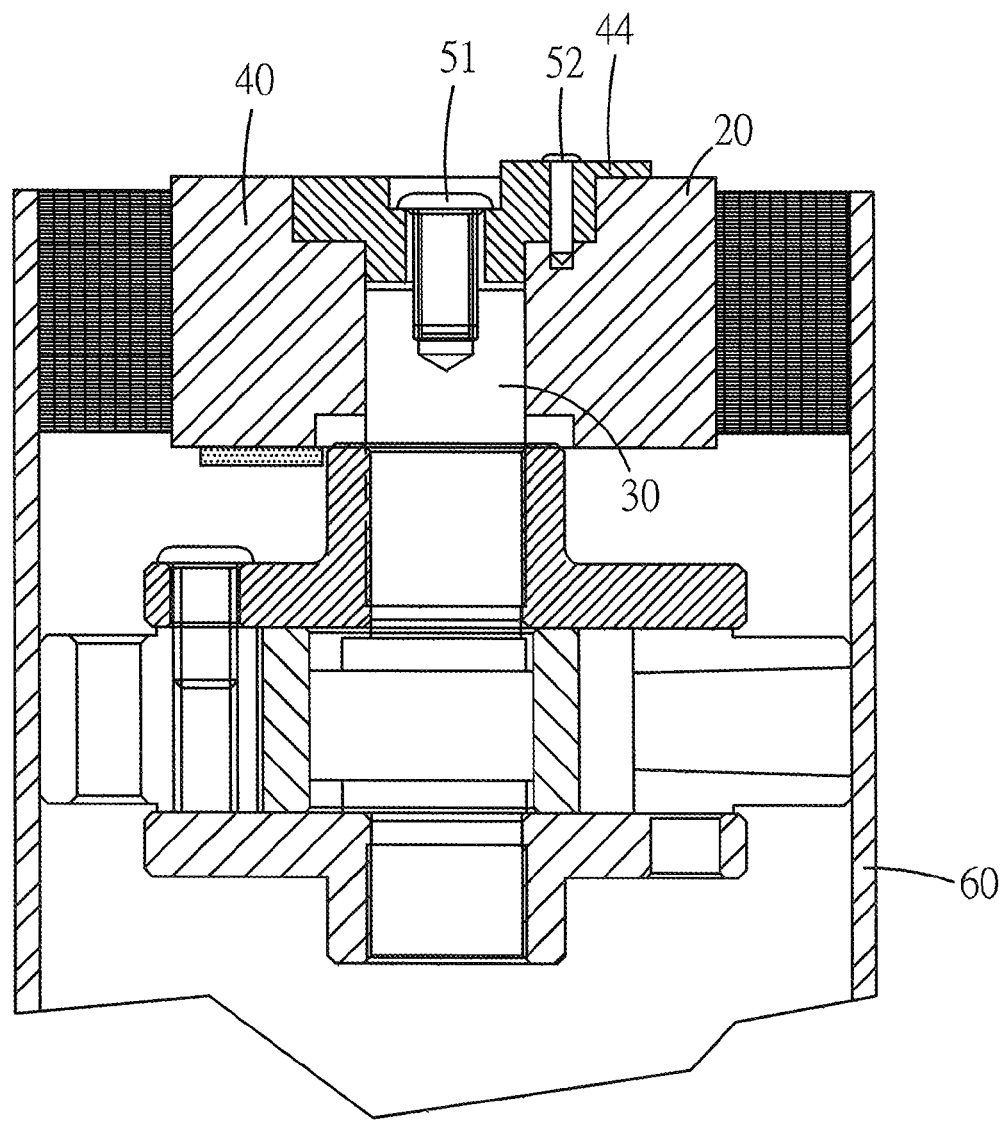
FIG. 6 is a schematic view of installing a shaft assembling structure of the second preferred embodiment of the present invention.

It is noteworthy that the shaft assembling structure of the present invention is particularly applicable for assembling the eccentric shaft and motor rotor of the rotary compressor. In FIG. 4, the shaft 30 is manufactured into a rotary eccentric shaft inside a housing 60, and a weight 70 may be installed on the motor rotor, or the direction setting member 40 includes at least one weight portion 44 disposed thereon as shown in FIGS. 5 and 6. In an application, the at least one weight portion 44 may be a bump protruding from a surface of the direction setting member 40 (or a slot penetrating into a surface of the direction setting member), and the shaft 30 and the motor rotor 20 may have a better weight distribution effect through the weight portion 44. Such arrangement not just provides a stable and smooth operation of the motor rotor and shaft (or the eccentric shaft) of the rotary compressor only, but also improves the assembling quality and the production capacity of the rotary compressor.

What is claimed is:

1. A shaft assembling structure, comprising a motor rotor with a shaft hole formed thereon, and a shaft with a shaft end sheathed on a shaft hole of the motor rotor, characterized in that the shaft assembling structure comprises a direction setting member secured to the top of the motor rotor and embedded to the shaft, and the direction setting member includes at least one first direction setting portion disposed at the bottom of the direction setting member and extended into the shaft hole, and the shaft end of the shaft has at least one second direction setting portion embedded with the corresponding first direction setting portion, wherein the motor rotor includes a plurality of second screw holes formed at corresponding positions other than the shaft hole, and the direction setting member includes a plurality of second screw through holes corresponding to the second screw holes respectively and a plurality of second screws passed into the second screw through holes of the direction setting member and screwed into the second screw holes of the motor rotor respectively.

2. The shaft assembling structure of claim 1, wherein the direction setting member includes a first screw through hole corresponsive to the center of the shaft end of the shaft, and the shaft includes a first screw hole formed at the center of the shaft end and a first screw passed into the first screw through hole of the direction setting member and screwed into the first screw hole of the shaft.

3. The shaft assembling structure of claim 1, wherein each first direction setting portion is a bump with a predetermined height protruding from the bottom of the direction setting member, and each second direction setting portion is a slot with a predetermined depth penetrating into an end surface of the shaft.

4. The shaft assembling structure of claim 1, wherein each first direction setting portion is a slot with a predetermined depth penetrating into the bottom surface of the direction setting member, and each second direction setting portion is a bump with a predetermined height protruding into an end surface of the bump.

5. The shaft assembling structure of claim 1, wherein the direction setting member includes a plurality of first direction setting portions disposed at the bottom of the direction setting member and having different widths respectively, and the shaft includes a plurality of second direction setting portions disposed at the shaft end and corresponding to the first direction setting portions respectively, and each second direction setting portion has a width capable of embedding with the corresponding first direction setting portion precisely.

6. The shaft assembling structure of claim 5, wherein the direction setting member includes a first screw through hole corresponsive to the center of the shaft end of the shaft, and the shaft includes a first screw hole formed at the center of the shaft end and a first screw passed into the first screw through hole of the direction setting member and screwed into the first screw hole of the shaft.

7. The shaft assembling structure of claim 5, wherein the motor rotor includes a plurality of second screw holes formed at corresponding positions other than the shaft hole respectively, and the direction setting member includes a plurality of second screw through holes corresponsive to the second screw holes respectively and a plurality of second screws passed into the second screw through holes of the direction setting member and screwed into the second screw holes of the motor rotor respectively.

8. The shaft assembling structure of claim 5, wherein each first direction setting portion is bump with a predetermined height protruding out from the bottom of the direction setting member, and each second direction setting portion is a slot with a predetermined depth penetrating into an end surface of the shaft.

9. The shaft assembling structure of claim 5, wherein each first direction setting portion is a slot with a predetermined depth penetrating into the bottom of the direction setting member, and each second direction setting portion is a bump with a predetermined height protruding into an end surface of the shaft.

10. A shaft assembling structure, comprising a motor rotor with a shaft hole formed thereon, and a shaft with a shaft end sheathed on a shaft hole of the motor rotor, characterized in that the shaft assembling structure comprises a direction setting member secured to the top of the motor rotor and embedded to the shaft, and the direction setting member includes at least one first direction setting portion disposed at the bottom of the direction setting member and extended into the shaft hole, and the shaft end of the shaft has at least one second direction setting portion embedded with the corresponding first direction setting portion,
wherein the direction setting member includes a plurality of first direction setting portions disposed at the bottom of the direction setting member and having different widths respectively, and the shaft includes a plurality of second direction setting portions disposed at the shaft end and corresponding to the first direction setting portions respectively, and each second direction setting portion has a width capable of embedding with the corresponding first direction setting portion precisely.

11. The shaft assembling structure of claim 10, wherein the direction setting member includes a first screw through hole corresponsive to the center of the shaft end of the shaft, and the shaft includes a first screw hole formed at the center of the shaft end and a first screw passed into the first screw through hole of the direction setting member and screwed into the first screw hole of the shaft.

12. The shaft assembling structure of claim 10, wherein the motor rotor includes a plurality of second screw holes formed at corresponding positions other than the shaft hole respectively, and the direction setting member includes a plurality of second screw through holes corresponsive to the second screw holes respectively and a plurality of second screws passed into the second screw through holes of the direction setting member and screwed into the second screw holes of the motor rotor respectively.

13. The shaft assembling structure of claim 10, wherein each first direction setting portion is bump with a predetermined height protruding out from the bottom of the direction setting member, and each second direction setting portion is a slot with a predetermined depth penetrating into an end surface of the shaft.

14. The shaft assembling structure of claim 10, wherein each first direction setting portion is a slot with a predetermined depth penetrating into the bottom of the direction setting member, and each second direction setting portion is a bump with a predetermined height protruding into an end surface of the shaft.

* * * * *